No. 885,267. PATENTED APR. 21, 1908.
E. J. MARTEL.
CLASP.
APPLICATION FILED SEPT. 14, 1907.
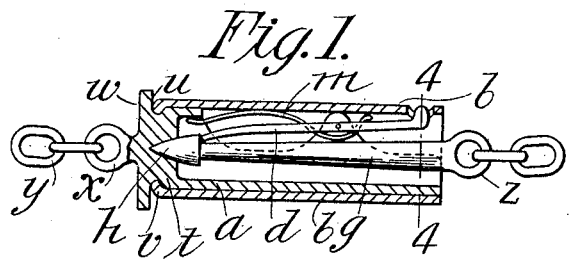
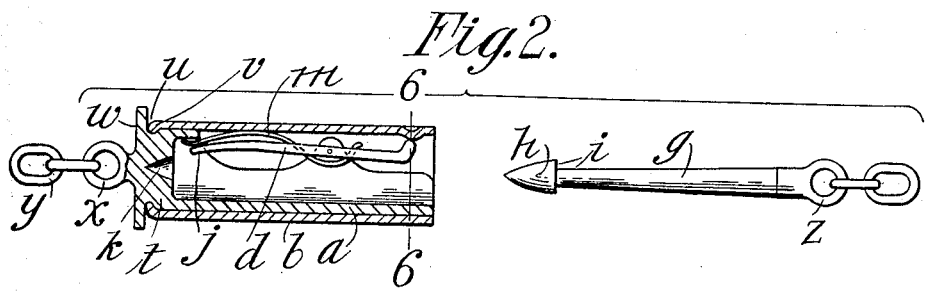
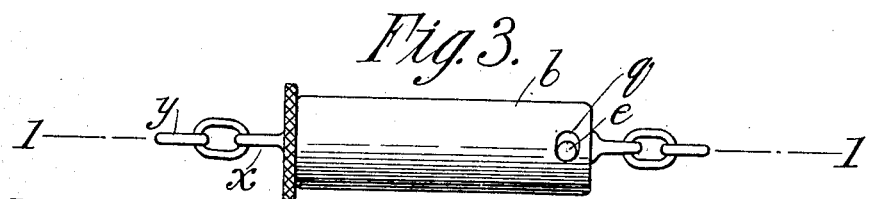
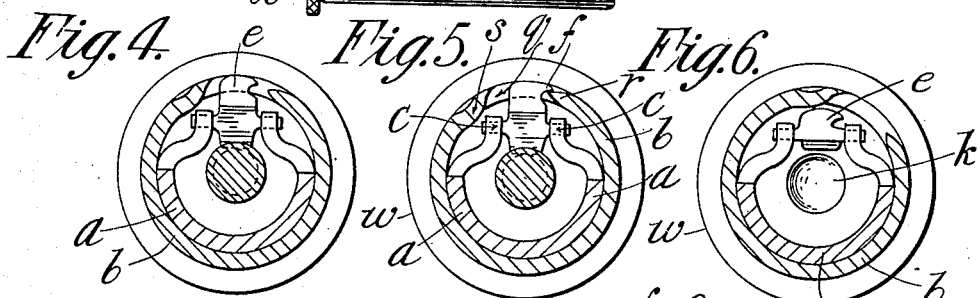
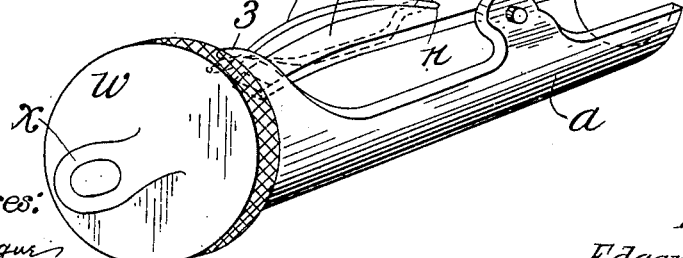
Witnesses:
H. L. Sprague
H. W. Bowen
Inventor,
Edgar J. Martel.
by
Attorneys.

UNITED STATES PATENT OFFICE.

EDGAR J. MARTEL, OF WARE, MASSACHUSETTS, ASSIGNOR OF ONE-HALF TO ZEPHIR POTVIN, OF WEBSTER, MASSACHUSETTS.

CLASP.

No. 885,267.   Specification of Letters Patent.   Patented April 21, 1908.

Application filed September 14, 1907. Serial No. 392,825.

*To all whom it may concern:*

Be it known that I, EDGAR J. MARTEL, a citizen of the United States of America, residing at Ware, in the county of Hampshire and State of Massachusetts, have invented new and useful Improvements in Clasps, of which the following is a specification.

My present invention relates to improvements in clasps for neck-chains and the like. The object of the invention is to provide a clasp or lock that will securely hold the ends of the chain together and without any danger of accidental separation and loss, a further object of the invention is to provide a device that cannot accidentally become unlocked and also one that provides a double locking means for the clasp.

Referring to the drawings, Figure 1 is a longitudinal sectional view on the line 1—1 of Fig. 3, showing the position of the parts locked. Fig. 2 is a detail view of the clasp showing the parts unlocked. Fig. 3 is an external view of the clasp with the parts locked together. Fig. 4 is a transverse sectional view on the line 4—4 of Fig. 1, showing the outer end of the locking lever in position for unlocking. Fig. 5 is a view similar to Fig. 4 showing the outer shell revolved so that the locking lever is brought over a projection or edge on the outer shell. Fig. 6 is a transverse sectional view on the line 6—6 of Fig. 2, showing the outer shell rotated in the reverse direction from that shown in Fig. 5, and Fig. 7 is a perspective view of the inner shell which carries the locking lever.

Referring to the drawings in detail $a$ designates the inner shell and $b$ the outer shell of the clasp. The inner shell is provided with inwardly bent ears $c$ to which is pivotally connected the locking lever $d$. This lever is provided with a bent end $e$ having a locking lip $f$, the opposite end of the lever is also a locking end for the spear $g$ that is shown in detail in Fig. 2. This spear is provided with a head end $h$, and a shoulder portion $i$ for receiving the end $j$ of the locking lever $d$, as clearly shown in Fig. 1 in its locked position. The inner shell $a$ is provided with a socket $k$ for receiving the head end $h$ of spear, as shown in Fig. 1.

$m$ designates a spring looped through openings $n$ and $o$ of the locking lever $d$ as shown in Fig. 7, the normal tendency of this spring being to force the end $j$ of the lever inward towards the axis of the shell.

The spear element $g$ is inserted, as shown in Fig. 1, so as to bring the opening $q$ in the barrel $b$ in register with the end $e$ of the lever $d$ and by rotating the shell $b$, the hooked end $f$ of the lever can be brought into engagement with the edge $r$ of the opening $q$. This position of the parts prevents the lever $f$ from being forced downwards and the end $j$ elevated.

The projection $s$ on the outer shell $b$ is adapted to engage the end $e$ of the lever $f$ when rotated in the opposite direction as shown in Fig. 6. This position is also shown in sectional elevation in Fig. 2, whereby the spear $g$ can be readily inserted and withdrawn without locking the parts together. When the parts are in the position shown in Fig. 4 or in Fig. 1, the user can by depressing the end $e$ of the lever $d$ readily disengage the end $j$ from the shoulder $i$ of the spear and permit the same to be withdrawn from the inner shell $a$.

It will be observed that the outer shell is rotatably secured to the head end $t$ of the inner shell by means of the annular groove $u$ and the bent-in portion $v$ of the outer shell $b$. Also the over-hanging end 3 of the inner shell affords a shoulder or ledge for the end of the spring $m$ to bear against. It will also be noted that the construction herein described permits the clasp to be in a locked condition as shown in Fig. 1 or in a double locked condition as shown in Fig. 5, or in an unlocked condition as shown in Figs. 2 and 6.

The inner shell $a$ is provided with a head $w$ to which the ring $x$ is attached and preferably made integral and to which one end of the chain designated at $y$ is secured. The other end of the chain is secured to eye $z$ of the spear $g$ as clearly shown in Fig. 2.

It will be evident from this detailed description of my invention that I have devised a very simple and efficient locking device or clasp for a neck-chain, or other similar article and one that will securely hold the chain together and prevent accidental loss thereof, from the clasp becoming unlocked.

What I claim, is:

1. In a locking device for neck-chains comprising an outer and an inner shell rotatably secured together, the inner shell carrying a locking lever pivotally secured to the same, a spear having an enlarged head for receiving the end of the locking lever, whereby the spear and shells are locked together.

2. In a clasp for neck-chains comprising an inner shell and an outer shell, the inner shell being provided with inwardly extending ears, a locking lever mounted in the ears and having its locking end extending towards the closed end of the inner shell and the operating end extending toward the open end of the said shell, the outer shell having an opening for receiving the operable end of the locking lever, a spear having a shoulder against which the locking end of the lever rests when in locking position, and means carried by the lever for normally holding the locking end of said lever toward the axis of the shell.

3. In a locking device for chains comprising an inner and outer shell rotatably mounted one on the other, a locking lever carried by the inner shell and having its operable end provided with a locking lip for engaging a portion of the outer shell when the outer shell is rotated in one direction, and a projection on the outer shell for engaging the locking lip when rotated in the opposite direction, whereby in one position said lever is rendered operative and in another position inoperative, and a spear provided with a shoulder for receiving the locking end of said lever.

4. In a clasp for neck-chains comprising an inner and an outer shell rotatably secured together, the inner shell having an over-hanging lip as 3, a locking lever pivotally mounted on the inner shell, a spring carried by the locking lever and having one end located under the over-hanging lip, whereby the locking lever is normally held toward the axis of the shell, a spear element for engaging a socket in the head end of the inner shell and provided with a shoulder for receiving the locking end of the lever, and means on the outer shell for placing the lever in a locked and unlocked condition, depending upon the direction of rotation of the outer shell.

5. As an article of manufacture a clasp comprising an inner and outer shell, the outer shell having a locking lip, an opening, and a projection, a locking lever carried by the inner shell and having its outer end projecting through the opening and also provided with a locking lip for engaging with either the locking lip of the outer shell or the projection on said shell, as described.

EDGAR J. MARTEL.

Witnesses:
Wm. C. Eaton,
Arthur F. Thayer.